United States Patent [19]
Battaerd et al.

[11] 3,839,237
[45] Oct. 1, 1974

[54] ION EXCHANGE RESINS HAVING BOTH ACIDIC AND BASIC ION-EXCHANGE SITES

[75] Inventors: Hendrik Adrian Jacobus Battaerd; Brian Alfred Bolto; Pir Ghulam Samadani Shah, all of Victoria, Australia

[73] Assignees: ICI Australia Limited, Melbourne, Victoria; Commonwealth Scientific and Industrial Research Organization, Campbell, both of, Australia

[22] Filed: May 21, 1973

[21] Appl. No.: 362,057

[30] Foreign Application Priority Data
May 31, 1972  Australia.............................. 9167/72

[52] U.S. Cl..... 260/2.1 R, 260/78.5 R, 260/80.3 N, 260/80.73, 260/86.1 N, 204/159.22, 210/32
[51] Int. Cl......................... C08f 15/02, C08f 15/40
[58] Field of Search....... 260/80.3 N, 80.73, 86.1 N, 260/2.1 R

[56] References Cited
UNITED STATES PATENTS

| | | | |
|---|---|---|---|
| 2,592,107 | 11/1948 | Azorlosa | 260/80.5 |
| 3,032,539 | 5/1962 | Schuller et al. | 260/85.5 |
| 3,639,208 | 2/1972 | Varveri et al. | 162/168 |

Primary Examiner—Stanford M. Levin
Attorney, Agent, or Firm—Cushman, Darby & Cushman

[57] ABSTRACT

Process for manufacturing an amphoteric polymeric composition wherein a mixture of monomers comprising (i) a monomer selected from the group consisting of acrylamide, methacrylamide, and lower alkyl esters of acrylic and methacrylic acid, and mixtures thereof, and (ii) a monomer selected from the group consisting of a strong mineral acid salt of triallylamine, 1,4-bis (N,N-diallyl-aminomethyl)benzene, 2,4,6-N,N-diallylaminomethyl)toluene, 1,6-bis (N,N-diallylamino)hexane, methyldiallylamine and ethyldiallylamine, and mixtures thereof, is polymerized in the presence of a free radical initiator, wherein the mixture of monomers is dissolved in a polar non-aqueous solvent system, and the resulting polymeric composition is subsequently hydrolyzed.

12 Claims, No Drawings

ION EXCHANGE RESINS HAVING BOTH ACIDIC AND BASIC ION-EXCHANGE SITES

This invention is concerned with ion-exchange resins which have both acidic and basic ion-exchange sites. Such "atmospheric" resins may be formed as a composite of acidic and basic ion-exchange sub-particles or moieties in an ion-permeable matrix. They may also be formed as a true or block copolymer, as a resin comprising an interlocked mixture of at least two polymers which may be in the form of either interpenetrating networks or the so-called "snake-cage" polymers - or as a resin comprising a mixture of these various types of structure in the one composition having these desired ion-exchange properties.

Amphoteric ion-exchange resins are of use in the purification of biological media and polymers, and pharmaceuticals, for example, penicillin, cosmetics, slow release medicines and water demineralisation processes. Amphoteric ion-exchange resins are of use because of their property of sequestering or chelating metal ions, in particular heavy metal ions.

Amphoteric ion-exchange resins also have a potentially important application in water demineralisation processes using thermally regenerable ion exchange resins, for example the "Sirotherm" process. ("Sirotherm" is a Trade Mark for ICI Australia's thermally regenerable ion exchange resins). The "Sirotherm" process is described in the publications:

"The Sirotherm Demineralisation Process - an Ion Exchange Process with Thermal Regeneration," Part 1. J. Inst. Engr. Aust. (1965) 37, 193;

"An Ion Exchange Process with Thermal Regeneration," Aust. J. Chem. (1966), 19, 561 (Part II,) 589 (Part III), 765 (Part IV) and 791 (Part V)

Australian Journal of Chemistry (1968) 21, pp. 2703-2710, "An Ion Exchange Process with Thermal Regeneration," Part VI;

"Thermally Regenerated Ion Exchange Process - An Aid to Water Management," J. Water Poll. Control Fed. (1966), 38, 1782;

and Australian Pat. No. 274,029.

Resins having a thermally regenerable ion-exchange capacity of use in the "Sirotherm" process are of the weak-acid or weak-base type and have such inherently slow rates of salt-uptake that their use in conventional mixed-bed systems is impractical for large-scale water treatment. As it would be expected that smaller acidic and basic particles and closer particle spacing should greatly improve the rate of ion-exchange, attempts have been made to produce amphoteric resins having acidic and basic moieties; but, although the ion-exchange rates can be high, such polymers normally have a thermally regenerable ion-exchange capacity of no more than a few per cent of the chemically regenerable total capacity, and certainly below 0.2 meq/gm, which renders them quite impractical for water demineralisation.

One attempt to avoid these difficulties is the use of a particulate amphoteric ion-exchange resin in which minute that discrete particles of ion-exchange resins are incorporated in an ion-permeable matrix. Though the ion-exchange rates of such "plum-pudding" resins are inferior to the amphoteric polymers previously mentioned, the thermally regenerable capacities are superior, and the overall kinetics are much better than those of a conventional mixed bed.

It has been postulated that the ion-exchange rates of mixed beds of weak electrolyte resins are probably limited by the rate of proton transfer between the acidic and basic resins, even where the dimensions of the ion-exchange particles and their spacing is of the order of microns; and that the ion-exchange capacity of an amphoteric polymer is probably limited by self-neutralisation, that is pairing of moieties of opposite polarity within the polymer itself. Thus, very close spacing of acidic and basic moieties is highly desirable but the tendency for self-neutralisation must be minimised. Moreover, it is also appreciated that self-neutralisation probably takes place to a large degree in the constituent acidic and basic components of the system before or during the formation of the final polymeric structure.

We have now found a method of substantially reducing self-neutralisation of the acidic and basic moieties during polymerisation and of obtaining an amphoteric resin of increased ion-exchange capacity.

Accordingly we provide a process of manufacturing an amphoteric polymeric composition which process comprises firstly polymerising a mixture comprising a monomer containing a basic group of an organic, non-charged or negatively charged, derivatives thereof and a monomer containing an acid group or an organic, non-charged or positively charged, derivatives thereof and wherein the monomers are not of opposite charge, to form a polymeric composition, secondly treating the polymeric composition to form an amphoteric polymeric composition.

The process may be carried out in the presence of a solvent. The choice of solvent to be used in the process of our invention is important. We have found that reaction in aqueous solutions in general gives polymeric compounds having low thermally regenerable ion-exchange capacity.

Preferably the process of our invention is carried out in the presence of a solvent system in which all the monomers are soluble. Most preferably the solvent system is non-aqueous and comprises a polar organic solvent such as acetone, dimethylformamide, acetonitrile, dimethyl sulphoxide, methyl ethyl ketone, lower alkyl alcohols containing from one to six inclusive carbon atoms, e.g. methanol, ethanol, propan—2—ol, butan—1—ol. The monomers chosen for the preparation of the resins in accordance with the present invention may be, typically, those known in the art to be suitable for the production of ion-exchange resins or organic derivatives thereof. The basic sites may, for example, be derived from any weakly basic groups, such as substituted amines, preferably ethylenically substituted amines such as allylamines and especially triallylamines; similarly, acidic sites may be those derived from unsaturated carboxylic acid containing groups such as acrylic acid and methacrylic acid. Other monomers which would be suitable for resins of this type include basic monomers such as N-alkylethyleneimines, dimethylaminoethyl methacrylate, t-butylaminoethyl methacrylate, N,N-dialkylaminomethylstyrene and acidic monomers such as maleic acid, vinylacetic acid, allylacetic acid, maleamic acid, N-alkylmaleamic acids, N-arylmaleamic acids and the like.

Suitable organic derivatives of the monomers which will act as non-charged or like-charged precursors for the ion-exchange sites include, in the case of basic groups, amides of primary or secondary ethylenically substituted amines, such as N-acetyl-N,N-diallylamine and the like. A suitable precursor for tertiary amino groups would be products formed by the reaction of the amine with a halogenated acid as for example in the reaction of triallylamine with 3-chlorobutyric acid. A suitable precursor for primary amino groups is the nitrile, such as acrylonitrile, methacrylonitrile, vinylacetonitrile, allylacetonitrile, maleonitrile and the like.

Precursors for acidic groups include esters, acyl halides, amides, imides, nitriles, acid anhydrides and aminoesters, such as the methyl and other non-charged esters of acrylic, methacrylic, vinylacetic, allylacetic, maleic, maleamic, itaconic and fumaric acids, the amides, imides, nitriles, acid anhydrides and aminoethyl, N-alkylaminoethyl or N,N-dialkylaminoethyl esters of the aforementioned acids.

The nature of the allylamine if present is not narrowly critical and the composition of our invention may be prepared using any amine having one or more allyl substituents. Suitable allylamines include, for exammple, allylamine, diallylamine, triallylamine and alkyldiallylamines. Other suitable allylamines include compounds of the general formula I

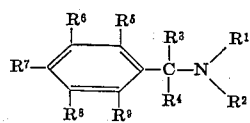

wherein $R^1$ is an allyl group; $R^2$ is either a hydrogen atom or an alkyl or substituted alkyl, which group being either saturated or olefinically unsaturated; $R^3$, $R^4$, $R^5$, $R^6$ and $R^7$ separately, is a hydrogen or halogen atom or an alkyl, substituted alkyl, aryl, substituted aryl, nitro, dialkylamino alkyl or

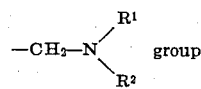 group except that not more than two of $R^3$, $R^4$, $R^5$, $R^6$ and $R^7$ may be the group

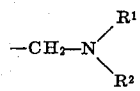

and except that not more than four of $R^3$, $R^4$, $R^5$, $R^6$ and $R^7$ may be hydrogen.

Preferably the olefinically unsaturated group is allyl. A preferred class of compounds of general formula I as defined hereinbefore consists of compounds of general formula II:

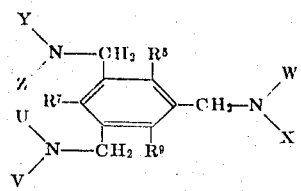

wherein $R^5$, $R^7$ and $R^9$ are as defined hereinabove and U, V, W, X, y and Z are allyl. A further preferred class of compounds of general formula I as defined hereinbefore consists of compounds of general formula III.

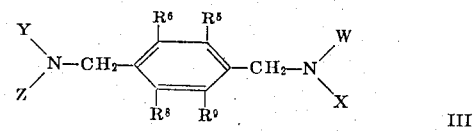

wherein $R^5$, $R^6$, $R^8$ and $R^9$ are as defined hereinabove and W, X, Y and Z are allyl.

Other suitable allylamines include, for example, amines of the general formula IV:

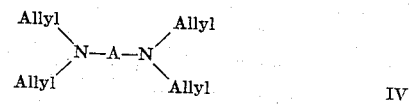

where A is an alkylene group containing 2 to 8, preferably five to seven inclusive carbon atoms, for example, 1,6-bis(N,N-diallylamino) hexane.

Preferred monomers for use in the preparation of ion exchange resins suitable for use in the Sirotherm process include, for example: triallylamine, methyldiallylamine, ethyldiallylamine, 1,4-bis(N,N-diallylaminomethyl) benzene, 2,4,6-tris(N,N-diallylaminomethyl)toluene, 1,2,4-tris(N,N-diallylaminomethyl)benzene, 1,6-bis(N,N-diallylamino)hexane, n-propyl diallylamine, benzyl diallylamine.

It will be understood by those skilled in the art that, in order to polymerize the allylamines must normally be present as salts. Hence all references in this specification to the polymerisation of allylamines, even when not specifically described as salts, are to the amines in their polymerisable form.

Suitable salts are the salts of allylamines with strong acids such as, for example, hydrochloric, sulphuric, nitric or phosphoric acid. Generally speaking, the pH, temperature and other conditions associated with the polymerisation process may be those known in the art for the polymerisation of the appropriate monomers concerned. The nature of the polymerisation initiator is not critical. Radiation-initiated polymerisation is particularly convenient. Nevertheless, monomers have been successfully polymerised by the use of chemical initiators to yield resins with analogous ion-exchange properties to those of essentially the same resin prepared in the same way but employing gamma radiation for the polymerisation. When aqueous solvent systems are used water soluble initiators of various sorts, such as potassium persulphate, alpha, alpha'-azo-bis-beta-cyanoisovaleric acid, alpha, alpha'-azo-bis-isobutyronitrileamidinium hydrochloride and cumene hydroperoxide, and various redox systems such as $K_2S_2O_8$/$K_2S_2O_5$ and cumene hydroperoxide/$FeSO_4$ may be employed. When the more preferred solvent systems comprising polar solvents such as acetone, dimethylformamide and the like are used (as when the two monomers are an ester or an amide and an amine salt), chemical initiators such as alpha, alpha'-azo-bis-isobutyronitrile, cetyl peroxide carbonate, lauryl peroxide, t-butyl perpivalate, t-butylcyclohexyl peroxydicarbonate, azo-bis-dimethyl-valero nitrile, benzoyl peroxide and organic soluble analogues thereof may be employed.

In certain cases it is advantageous to combine chemical initiation with radiation initiation. For example, it is possible to increase the degree of crosslinking of a polymer formed by chemical initiation if the polymer is further treated with radiation.

It is possible to use irradiation as the initiator. Irradiation can be used to initiate the polymerisation of all the allylamines of general formula I in the form of salts.

Accordingly in one aspect of our invention we provide a process of manufacturing polymeric compounds, said process comprising exposing the mixture as defined hereinbefore to high energy radiation at a temperature of between −80° and 120°C and isolating the polymer or polymer salt so formed.

By high energy we mean radiation having a wavelength of less than 100 Angstrom, in particular gamma- and beta- rays derived from isotopes or in the form of fast electrons such as produced by a Van de Graaff generator and an electron accelerator. Other sources of ionising or high energy radiation are known in the art, e.g. from British Patent No. 801,528, page 1, lines 49 − 56; these include neutrons, accelerated heavy particles and X-rays or mixtures of them. A convenient practical source of high energy radiation is a Cobalt 60 source.

The dose rate of irradiation controls the rate of initiation of the polymerisation, but has little effect on the properties of the polymer formed. Dose rates between 10 rad/hr and 5 megarad/hr are operative and rates between 20,000 rad/hr and 1 megarad/hr are convenient in practice. However, the total dose delivered to the polymerisation mixture affects the yield as well as the physical properties of the polymer produced. Doses from 3 megarad up to 20 megarad are operative; optimum yield of polymer is usually achieved at 5 to 15 megarad.

Radiation, usually and preferably, is carried out in an inert atmosphere such as nitrogen or argon. The presence of air does not stop the polymerisation, but a reduction in yield and capacity was observed.

We have found that in the process of our invention mixtures of monomers comprising methacrylamide are conveniently polymerised using gamma-radiation or a chemical initiator as the free radical generator.

Mixtures of monomers comprising acrylamide are preferably polymerised using a chemical initiator as the free radical generator.

For use as ion-exchange resins the polymers and copolymers of this invention must be produced within controlled particle size ranges.

The particles of the required size ranges may be obtained by bulk polymerisation followed by grinding and sieving. Preferably the particles are prepared in the required size ranges by a dispersion polymerisation technique.

It will be appreciated by those skilled in the art that the solvent and monomer systems referred to above concern the components which are actively involved in the production of the desired amphoteric resins.

The polymerisation is preferably carried out in a medium which will dissolve the monomer components to form a homogeneous solution. In some cases it may be advantageous to partially polymerise one of the monomers before the other monomer is added.

Whether the resins are produced in bulk or particulate form can be determined by the use of a secondary liquid phase which need not include any reacting components but merely makes it possible to disperse the monomer solution in a supporting medium which is immiscible with the solvent used to make up the monomer solution. In this way, the product can be made in the form of particulate bead-like material having a particle size which makes it suitable for use in ion-exchange columns. The size of the beads depends on the concentration of stabilisers, the monomer solution, the stirring rate, the temperature and the geometry of the reaction vessel. Beads between 200 mesh BSS and 10 mesh BSS can easily be achieved. The choice of supporting medium is not narrowly critical, provided the insolubility requirements are satisfied.

Suitable supporting media are solvents which form two separate phases when mixed with the solvent used to dissolve the mixture of monomers. For the normal polar solvents such as dimethyl formamide, acetone, methylethyl ketones or lower aliphatic alcohols, a convenient supporting medium is a non-polar solvent such as for example, petroleum ether, paraffin oils, aromatic hydrocarbons or chlorinated hydrocarbons.

The choice of stabiliser is not narrowly critical; certain surfactants used in dispersion polymerisation, e.g. hydrocarbon soluble non-ionic surface active agents as well as cellulose ethers or polyvinyl alcohols and derivative polyvinyl alcohols are suitable.

The choice of solvent system also has an influence on the pH which will be chosen for polymerisation but, generally speaking, the polymerisation pH will be found to lie between 3.5 and 6.8, though some combinations of monomers will require the polymerisation pH to lie outside this range.

To some extent, another factor influencing polymerisation pH conditions is the choice of monomer ratios to give the required ratio of basic and acidic groups.

The polymeric composition obtained from the polymerisation of a mixture of monomers not of opposite charge is treated to convert the organic derivative to the amphoteric polymeric composition. Any reaction procedure known in the art may be employed which is capable of converting the blocking group to an ion-exchange site, but is not capable of destroying the polymer chain. Thus for example when an ester, amide, imide, nitrile or acid anhydride is used as the precursor, it may be hydrolysed by treatment of the polymeric composition with dilute aqueous acid or alkali. We prefer where possible to treat such a polymeric resin with aqueous caustic soda solution under reflux for several hours. This alkali treatment will also convert precursors formed from tertiary amines and chlorinated carboxylic acids to the original tertiary amino form. When a nitrile is used as the precursor for the basic group, hydrogenation or reduction to the primary amino form will be necessary.

Following polymerisation and unblocking, it is preferable to subject the product resin - preferably in particulate form - to a pH equilibration treatment to achieve the optimum ion-exchange performance. Normally, this simply involves stirring the resin in an aqueous salt solution at room temperature (ca. 20°C) and adding sodium hydroxide until the desired pH level is obtained, care being taken to ensure that the final equilibrium salt concentration is at the required level. The salt concentration employed is that of the water to be treated by a desalination process. The resin is now suitable for use in column operation of a thermally regenerable process, as described in our prior Australian Patent No. 274,029. For purposes of evaluation, however, the resin may be washed with hot water at ca. 80°C to obtain it in a regenerated form, and the amount of salt taken up by stirring the regenerated resin in salt solution at room temperature used as a measure of the effective capacity of the system. The time necessary to achieve salt uptake equivalent to 50 percent of the equilibrium level (the "half time") may be used as a convenient measure of the rate of salt adsorption.

Finally, it will be appreciated that the amphoteric resins formed in accordance with the present invention must differ from the prior art amphoteric resins where self-neutralisation must involve association of oppositely charged sites which, from the steric or structural standpoint, defines a resin which is significantly different from one where self-neutralisation has been minimised. However, while this difference in structure is difficult to define by chemical or physical analysis, a ready indicator is provided by the significantly increased effective capacity.

The ion-exchange capacity of the product produced by our process depends to a great extent on the monomers used.

Suitable combinations of monomers to give a desired ion-exchange capacity may be found by simple experiment.

Thermally regenerable resins have a potentially important application in water demineralisation processes because low-grade heat can be efficiently employed for regeneration and certain of these resins are of use in the desalination of water by the so-called Sirotherm process.

For use in the Sirotherm process we prefer that the monomer containing a basic group or an organic noncharged or negatively charged derivative thereof, is an allylamine.

Polymeric compositions having suitable ion-exchange properties for the "Sirotherm" process may be made by the process of our invention followed by an unblocking stage if necessary from mixtures comprising a molar ratio of allylamine salt to the acid or acid derivative in the range from 10 : 90 to 90 to 10 preferably from 20 : 80 to 60 : 40.

Resins of particular use in the "Sirotherm" process may be prepared from a mixture of monomers comprising acrylamide, methacrylamide or a lower alkyl ester of acrylic acid or methacrylic acid as the monomer containing a non-charged organic derivative of an acid group.

Although a suitable amphoteric polymeric composition can be produced by the polymerisation of a mixture consisting solely of a basic and an acidic monomer or derivatives thereof, the number of monomers employed need not be restricted to two. In certain instances it may be advantageous to have more than one acidic or basic monomer or its precursor, so that three, four or even more monomers may be present in the polymerisation mixture. A range of products may be prepared which are homofunctional in basic and acidic groups or homofunctional in only basic or acidic groups and heterofunctional in the other, or heterofunctional in both types of groups.

We have found that in certain cases it is advantageous to add a third monomer component which is not a precursor for ion-exchange groups and which is preferably non-charged. We believe that it acts to separate the acidic and basic groups of the amphoteric polymeric composition thus further hindering self-neutralisation.

Suitable neutral third monomers are for example: vinyl acetate, methyl vinyl ether, styrene and the like.

Polymeric compositions having useful ion-exchange properties may be made when the proportion of the third monomer lies in the range from 0 – 70 percent w/w of the polymeric composition preferably from 5 – 50 percent w/w.

Preferably the third monomer is di-functional and acts as a crosslinking agent, leading to extension of the polymeric network.

Suitable crosslinking agents are, for example, ethylene glycol dimethylacrylate, 1,3-butylene glycol dimethylacrylate, divinylbenzene, triallyl cyanurate, the triallyl ether of pentaerythritol and the like.

Most desirably the crosslinking agent is ethylene glycol dimethylacrylate which is compatible with the monomer mixture in that it yields a homogenous and is not degraded by the treatment used to unblock the noncharged derivative of the basic or acidic monomer. We believe that the addition of a crosslinking agent has a twofold purpose: to aid in the permanent separation of the acidic and basic sites, and to minimise loss of linear polymer. Hence if the crosslinking agent polymerises at a rate comparable with that of the acid monomer or its non-charged or positively-charged derivative, two interpenetrating networks may be formed, with the crosslinked polyacid enmeshed in the polytriallylamine network, the latter being self-crosslinking. In cases where a noncrosslinking allylamine monomer is employed, a further crosslinking agent compatible with the allylamine may be used; two interpenetrating networks will again be formed.

We believe that the increase in effective capacity of such additionally crosslinked amphoteric polymeric compositions is due to the greater rigidity of the system; the ion-exchange groups cannot as readily relocate after the unblocking step because the network is held more firmly in its non-associated configuration.

The amount of crosslinking agent present is not narrowly critical but we have found that resins for use in the Sirotherm process may be prepared by polymerising mixtures comprising an allylamine salt, an acid derivative and a crosslinking agent wherein the crosslinking agent is present in an amount from 0 – 50 percent w/w of the polymeric composition preferably from 10 – 30 percent w/w.

The compounds of our invention may be used as chelating agents and sequestering agents and in the purification of biological materials.

The invention is illustrated by but by no means limited to the following examples in which all parts are parts by weight unless otherwise specified.

Example 1

This Example illustrates the preparation and properties of an amphoteric resin prepared from a mixture of methyl acrylate and triallylamine hydrochloride, polymerised in bulk by gamma radiation.

Methyl acrylate (4.8 ml., 54 meq.) was added to a 70 percent solution of triallylamine hydrochloride in water (8.3 ml., 35 meq.), together with sufficient dimethylformamide (2 ml) to give a homogeneous solution of pH 4.45. The solution was deoxygenated by a vacuum treatment cycle, in which the container was placed in liquid nitrogen to freeze the solution and the vessel connected to a vacuum system where pumping was continued for 2 min. The container was then sealed, removed from the liuqid nitrogen bath, and immersed in an acetone/dry ice slurry. After thermal equilibrium had been established, pumping was repeated for 0.5 min. The cycle was repeated a number of times to ensure complete oxygen removal.

The sample was irradiated using a $Co^{60}$ radiation source to a total dose of 10 megarad, at a dose rate of 0.3 megarad/hour. The hard yellow transparent mass which resulted was broken up into 16 – 60 Tyler mesh particles and extracted with ethanol under nitrogen in a Soxhlet apparatus for 12 hours to remove soluble organic material.

The resin was stirred in 5N. sodium hydroxide (200 ml) under nitrogen at 87°C for 48 hours to hydrolyze the methyl acrylate units to sodium acrylate units. The produce was washed in an ion-exchange column with 0.3N. alkali, 2N. hydrochloric acid, and water, using 20 bed volumes of the washing liquor in each case.

The ion-exchange properties of the resin were measured in the following general manner. A portion of resin particles in the size range 16 – 35 Tyler mesh was equilibrated by stirring the particles in aqueous saline solution containing 1000 ppm of sodium chloride and adjusting the pH to a preselected value by the addition of alkali, followed by the regeneration of the resin with hot distilled water in a jacketed column at 80°C. The time for 50 percent equilibrium and the effective capacity for salt uptake at complete equilibrium were measured by plotting as a function of time the volume of an aqueous saline solution containing 4000 ppm of sodium chloride which must be added to maintain a salt concentration of 1000 ppm saline, when 7 – 10 ml of the thermally regenerated resin were stirred in 200 ml of 1000 ppm saline at ca. 20°C. A half time of 3.5 min. and an effective capacity of 0.46 meq/g (0.11 mq/ml) were obtained at the determined optimum equilibration pH of 7.6.

A resin was similarly prepared from acrylic acid and triallylamine, without any blocking of the acidic or basic functions of the monomers being attempted. Glacial acrylic acid (2.4 ml, 35 meq) was mixed at ice temperature with tri-allylamine (6.1 ml, 35 meq) to give a clear solution of pH 6.1. After vacuum degassing, the solution was polymerised with a gamma ray dose of 10 megarad, delivered at a dose rate of 0.33 megarad/hr. The opaque resin which resulted was broken down into 16 – 60 Tyler mesh particles. The resin was washed, equilibrated in salt solution, and thermally regenerated as before. It had a negligible effective capacity, a fact which is attributed to self-neutralisation between oppositely charged sites within the resin.

A comparison of the data obtained from the resin prepared from methyl acrylate and triallylamine hydrochloride with resins of the plum-pudding type described in our copending patent application No. 30165/67, of the snake-cage and amphoteric type, and a normal mixed bed of commerical resins is shown below. The data shown are those obtained at the optimum pH in each case.

The snake-cage resin was made by polymerising acrylic acid inside beads of the weakly basic resin "De-Acidite" G by the method of M J Hatch, J A Dillon and H B Smith, Ind. Eng. Chem., 49, 1812 (1957). The amphoteric resin was made by reacting chloromethylated styrene-divinylbenzene copolymer beads with isonipecotic acid. This was done by swelling the dry beads (21.4 g, 0.16 equiv) in dimethylformamide (100 ml), and adding a solution of isonipecotic acid (60 g, 0.47 equiv) and sodium hydroxide (20 g, 0.5 equiv) in dimethylformamide (400 ml) and water (100 ml). The slurry was stirred at 80°C for 77 hours and was worked up in the usual manner.

| Resin 16–35 Tyler mesh | Effective capacity meq/g | Half time min. |
|---|---|---|
| 1 (a) Present example | 0.46 | 3.5 |
| (b) Plum-pudding resin ("De-Acidite" G/"Zeo-Karb" 226 in PVA matrix) | 0.66 | 25 |
| (c) Snake-cage resin ("De-Acidite" G/polyacrylic Acid) | 0.04 | 4 |
| (d) Amphoteric resin (Made from chloromethylated poly-styrene and isonipecotic acid) | 0.02 | — |
| (e) Mixed bed ("De-Acidite" G/"Zeo-Karb" 226) | 1.1 | Very high (>500) |

"De-Acidite" and "Zeo-Karb" are trade names for resins manufactured by the Permutit Company, London.

Example 2

This example illustrates the preparation of an amphoteric resin based on methyl acrylate, triallylamine hydrochloride, and vinyl acetate.

Methyl acrylate (4.8 ml, 54 meq) was added to a 70 percent solution of triallylamine hydrochloride (8.3 ml, 35 meq), together with vinyl acetate (3.0 ml, 20 percent of total weight of monomers) and sufficient dimethylformamide (5 ml) to give a homogeneous solution. The pH of the solution was 4.2. The mixture was deoxygenated irradiated, hydrolyzed and worked up as for Example 1.

Example 3

This Example illustrates the preparation and properties of an amphoteric resin based on methyl acrylate, triallylamine hydrochloride, and ethylene glycol dimethylacrylate.

Methyl acrylate (4.8 ml, 54 meq) was added to a 70 percent solution of triallylamine hydrochloride (8.3 ml, 35 meq) together with ethylene glycol dimethylacrylate and sufficient dimethylformamide to yield a homogeneous solution. Three different resins were made by altering the proportions of the last two components as shown below:

| Weight of ethylene glycol dimethacrylate g | Volume of dimethylformamide ml | Solution pH before irradiation | Effective capacity after hydrolysis meq/g |
| --- | --- | --- | --- |
| 0.48 | 4.0 | 3.9 | 0.73 |
| 1.44 | 4.0 | 3.8 | 0.73 |
| 2.90 | 5.5 | 4.1 | 0.74 |

The mixtures were deoxygenated, irradiated, hydrolysed, and worked up as described in Example 1. When equilibrated in 1000 ppm saline to pH 7.6 and regenerated with hot distilled water at 80°C, the effective capacities shown in the above Table were obtained.

Column operation demonstrating a thermally regenerable process was carried out using the first of the above resins, prepared on a larger scale. Its half time for salt uptake was 4 min. About 80 ml of the resin beads were stirred in aqueous saline solution containing 1000 ppm of sodium chloride at room temperature, and 0.3N. alkali was added until the pH of the slurry was 6.5. The resin was then packed in a jacketed column. Cold (20°C) 1000 ppm sodium chloride solution and hot (80°C) 500 ppm sodium chloride solution were passed alternately through the column, at flow rates varying from 1.2 to 2.5 gall/cu.ft./min. Salt was released from the resin to the regenerant feed during the hot cycle, to yield a more concentrated solution as effluent, and adsorbed from the feed solution during the cold cycle, to yield a more dilute solution as the product. The operation was carried out by the method described in U.S. Pat. No. 3,425,937 to give the results shown below.

| Flow Rate in gall/cu.ft/min. | | Mean Salt Concentration in ppm | | Operating Capacity on adsorption or regeneration 20°C - 80°C in meq/ml |
| --- | --- | --- | --- | --- |
| Cold | Hot | Product | Effluent | |
| 0.8 | 1.0 | 480 | 1175 | 0.064 |
| 1.2 | 1.7 | 520 | 1125 | .058 |
| 1.8 | 2.3 | 565 | 1050 | .056 |
| 2.5 | 2.3 | 590 | 1050 | .052 |

Example 4

This Example illustrates the preparation and properties of an amphoteric resin made from a mixture of methacrylamide and triallylamine hydrochloride, bulk polymerised using either gamma radiation or chemical initiation.

Methacrylamide (5.1 g, 60 meq) was added to a 70 percent solution of triallylamine hydrochloride (8.3 ml, 35 meq), together with water (10 ml) and dimethylformamide (10 ml) to yield a clear solution of pH 5.5. After deoxygenation the solution was irradiated in the usual manner. The hard, opaque product was ground to 16 – 60 Tyler mesh and extracted with hot ethanol under nitrogen for 12 hours. The resin was then stirred in 2N. sodium hydroxide (250 ml) under nitrogen at 87°C for 17 hours to hydrolyze the methacrylamide units to sodium methacrylate units. The product was column washed using 20 bed volumes each of 0.3N alkali, 2N hydrochloric acid, and water. The half time of the resin for salt uptake and the effective capacity were determined as in Example 1. The effective capacity varied with the equilibration pH as indicated below:

| Equilibration pH | Effective Capacity |
| --- | --- |
| 6.0 | 0.20 meq/g |
| 6.5 | 0.53 |
| 7.0 | 0.97 |
| 7.25 | 0.94 |
| 7.5 | 0.95 |
| 7.9 | 0.77 |

The half time of the resin equilibrated to pH 7.25 was 15 min. and the effective capacity on a volume basis was then 0.20 meq/ml.

A similar resin was prepared in bulk by dissolving alpha, alpha'-azo-bis-isobutyronitrile (0.28 g, 2.3 percent w/w based on total monomers) in the monomer solution and heating it under nitrogen at 70°C for 16 hours. It was worked up in a completely analogous manner.

Column operation demonstrating a thermally regenerable process was carried out using the above resin prepared via gamma irradiation but on a larger scale. The procedure used in the column studies was as outlined in Example 3, using 1000 ppm sodium chloride solution as feed water for the adsorption stage, and 500 ppm solution as the regenerant, but the resin was initially equilibrated to pH 7.2. A flow rate of 2 gall/cu.ft/min was employed, and a yield of 71 percent was obtained, comprising 20 bed volumes of product water of mean concentration 450 ppm with 8.1 bed volumes of effluent of mean concentration 1800 ppm. The operating capacity of the bed was 0.18 meq/ml.

The column experiment was repeated using a feed water containing 1000 ppm sodium chloride and 111 ppm calcium chloride and a regenerant of 500 ppm sodium chloride. The resin was initially equilibrated to the higher pH of 7.7. The yield was now 68 percent, comprising 14.8 bed volumes of product water containing a mean concentration of 430 ppm of total dissolved salts, and 7.2 bed volumes of effluent containing 1760 ppm of total dissolved salts. The operating capacity of the column was 0.17 meq/ml (0.14 meq/ml towards sodium chloride, 0.03 meq/ml towards calcium chloride).

Example 5

This Example illustrates the preparation of an amphoteric resin based on methacrylamide and triallylamine hydrochloride, polymerised as a suspension using chemical initiation.

Methacrylamide (10.2 g, 120 meq) was added to a 70 percent solution of triallylamine hydrochloride (16.6 ml, 70 meq) and dissolved by the addition of water (20 ml). A water soluble initiator in the form of potassium persulphate (0.22 g, 1 percent w/w based on total monomers) was dissolved in the monomer solution, which was deaerated by vacuum treatment and flushing with nitrogen.

The aqueous solution was dispersed in paraffin oil (400 ml) at 90°C by stirring at 500 rpm with a fixed-blade stirrer of propellor shape. The stirred suspension was heated for a total period of 7 hours at 90°C. The solid beads were then filtered off and washed on a sintered glass filter funnel with hexane, followed by acetone, using three alternating washes with each solvent. The usual hot alcohol extraction followed and the beads were hydrolyzed by stirring them in 2N. alkali (500 ml) at 87°C under nitrogen for 17 hours. They were column washed with alkali, acid, and water in the usual manner.

Example 6

This Example illustrates the preparation and properties of an amphoteric resin based on dimethylaminoethyl methacrylate hydrochloride and triallylamine hydrochloride.

Dimethylaminoethyl methacrylate (16.6 ml, 106 meq) was mixed with 70 percent triallylamine hydrochloride solution (8.3 ml, 35 meq) and 5N. hydrochloric acid (19.5 ml. 98 meq) the mixture being cooled in an ice bath during the addition of the acid. The solution had a pH of 1.0, so a further quantity of dimethylaminoethyl methacrylate (1.0 ml. 6 meq) was added to raise the pH to 5.7.

After deoxygenation, the mixture was irradiated to 10 megarad using a $Co^{60}$ source. The clear colourless reaction product was broken up into 16 – 60 Tyler mesh particles and extracted with hot ethanol. The resin particles were then stirred in 57 percent hydriodic acid under nitrogen at 127°C for 24 hours to hydrolyze the amino ester units to methacrylic acid units. The particles were then again extracted with hot ethanol prior to the normal column washing with alkali, acid, and water.

After equilibration at what was found to be the optimum pH or 6.2 in 1000 ppm saline and thermal regeneration at 80°C, the resin had an effective capacity of 0.20 meq/g.

Example 7

This Example illustrates the preparation and properties of an amphoteric resin based on methyl acrylate and 1,4-bis-(N,N-diallylaminomethyl)benzene.

Methyl acrylate (4.2 ml, 47 meq) was mixed with 1,-4-bis-(N,N-diallylaminomethyl)benzene (5.4 g, 19 meq) and 5N. hydrochloric acid (4 ml. 20 meq) at ice bath temperature. Dimethylformamide (20 ml) and sulphuric acid (0.25 ml, 9 meq) were added to form a homogeneous liquid phase. The mixture was deoxygenated, irradiated, hydrolyzed and worked up as described in Example 1. The effective capacity of the product at pH 7.2 was 0.87 meq/g.

Example 8

This Example illustrates the preparation and properties of an amphoteric resin prepared by chemical initiation of a mixture of methacrylamide and triallylamine hydrochloride, and hardened by gamma irradiation from a $Co^{60}$ source.

Methylacrylamide (5.1 g, 60 meq) was added to a 70 percent solution of triallylamine hydrochloride (8.3 ml, 35 meq) and dissolved by the addition of dimethylformamide (10 ml). Initiator in the form of alpha, alpha',-azo-bis-isobutyronitrile (0.55g, 5 percent w/w based on total monomers) was dissolved in the monomer solution, which after deoxygenation was heated under nitrogen at 70°C for 16 hours. A portion of the product was irradiated to 10 megarad at a dose rate of 0.3 megarad/hr. Both samples were then worked up and hydrolyzed in the usual manner. The mechanical strength of the resin was found to be improved by the radiation treatment. The effective capacities at pH 7.3 of the irradiated and non-irradiated products were 0.53 and 0.57 meq/g respectively.

Example 9

This example illustrates the preparation of an amphoteric resin based on methacrylamide and triallylamine hydrochloride, polymerised as a suspension using chemical initiation.

Methacrylamide (10.2 g, 120 meq) was added to a 70 percent solution of triallylamine hydrochloride (16.6 ml, 70 meq) and dissolved by the addition of dimethylformamide (20 ml). Initiator in the form of alpha, alpha'-azo-bis-isobutyronitrile (1.1 g, 5 percent w/w on total monomers) was dissolved in the solution of monomers, and the whole deaerated by vacuum treatment and flushing with nitrogen. The solution was dispersed in paraffin oil (400 ml) containing the surfactant sorbitan mono-oleate (4 ml) at 70°C by stirring at 350 rpm. The suspension was stirred for a total period of 17 hours at 70°C. The cooled beads were filtered off and washed with hexane and acetone, using three alternating washes with each solvent.

The resin was hydrolysed by stirring the dried beads in alkali (300 ml of 2N sodium hydroxide at 90°C under nitrogen for 17 hours. The hydrolysed beads were washed with alkali, acid and water in an ion-exchange column. When equilibrated to pH 7.3 in 1000 ppm saline and thermally regenerated at 80°C with distilled water, an effective capacity for salt uptake of 0.67 meq/g was obtained.

Example 10

This example illustrates the preparation and properties of an amphoteric resin based on methacrylamide and triallylamine hydrochloride, polymerised as a suspension using radiation initiation.

Methacrylamide (20.4 g) was dissolved in dimethylformamide (40 ml) and added to a 70 percent solution of triallylamine hydrochloride (48.3 ml). The clear solution was then poured into paraffin oil (400 ml) in a round-bottomed flask. Sorbitan mono-oleate (0.5 ml) was added as a suspension stabiliser. The mixture was purged with oxygen-free dry nitrogen prior to radiolysis, and oxygen was excluded throughout the experiment by a positive pressure of nitrogen. The reaction was terminated after a total dose of 6.8 megarad. Opaque beads of 0.5 mm in size were obtained. These were very hard and did not disintegrate during the hydrolysis step which was carried out using hot alkali in the usual manner.

After equilibration to pH 7.3 in 1000 ppm saline, followed by thermal regeneration at 80°C, the beads were found to have an effective capacity of 0.79 meq/g.

Example 11

This example describes the preparation and properties of an amphoteric resin prepared from acrylamide and triallylamine hydrochloride, polymerised with conventional chemical initiation under suspension conditions to produce ion-exchange resin beads.

A solution of acrylamide (5 g, 70 meq), triallylamine hydrochloride (11.6 g, 70 meq) and alpha, alpha'-azo-bisisobutyronitrile (0.41 g, 2.5 percent) w/w on total monomers) in propan-2-ol (8.3 ml) was dispersed in paraffin oil (400 ml) containing the surfactant sorbitan mon-oleate (4 ml).

Both the monomer solution and the supporting medium were first deoxygenated. The oil phase was heated to 80°C under nitrogen, and the monomer solution dispersed in it by stirring at 500 rpm. Stirring and heating were continued for 17 hours, after which the cooled product beads were filtered off, washed with hexane and acetone, and dried. The yield (13.9 g) was 84 percent of that theoretically possible.

The beads (10.0 g) were hydrolysed by stirring in alkali (300 ml of 2N sodium hydroxide) at 90°C under nitrogen for 17 hours. The hydrolysed beads (7.1 g) were obtained in 71 percent yield after washing in acid to convert them to the carboxylic acid/amine hydrochloride form, followed by drying.

After equilibration to pH 6.8 in 1000 ppm saline and thermal regeneration at 80°C, the effective capacity of the resin was found to be 0.63 meq/g.

Example 12

This example shows that the ion-exchange properties of the resin made by the radiation polymerisation of methacrylamide and triallylamine hydrochloride as described in Example 4 may be improved upon by using a mixture of methyldiallylamine and triallylamine hydrochlorides rather than only the latter monomer to provide the anion-exchange sites.

Methacrylamide (5.1 g, 60 meq) was added to a mixture of a 70 percent solution of methyldiallylamine hydrochloride (5.6 ml, 26 meq) and a 70 percent solution of triallylamine hydrochloride (2.1 ml, 8.8 meq) in dimethylformamide (10 ml) and water (5 ml). A clear solution of pH 5.1 was obtained, and this was irradiated after deoxygenation, as described in detail in Example 1. The product was ground to 16 – 60 Tyler mesh extracted with alcohol, and hydrolysed in alkali (300 ml of 2N sodium hydroxide) by stirring under nitrogen at 90°C for 17 hours. The hydrolysed granules were washed in a column in the usual manner.

After equilibration at pH 7.7 in 1000 ppm saline and thermal regeneration at 80°C, an effective capacity measurement of 1.16 meq/g was obtained, versus the optimum value of 0.97 meq/g found for the product obtained with only triallylamine hydrochloride as the amine monomer (Example 4).

Example 13

This example illustrates the preparation and properties of an amphoteric resin made by polymerising a solution of acrylamide and triallylamine hydrochloride using conventional chemical initiation.

Acrylamide (5.0 g, 70 meq) was added to a 70 percent solution of triallylamine hydrochloride (8.3 ml, 35 meq), together with alpha, alpha'-azo-bis-isobutyronitrile (0.55 g of 5 percent w/w based on total monomers) and ethanol (10 ml). After deoxygenation, the clear solution was heated at 60°C under nitrogen for 24 hr. The product was worked up and hydrolysed in the normal manner. Thermal regeneration of resin equilibrated to pH 6.8 gave an effective capacity value of 0.86 meq/g.

Example 14

This example demonstrates the effect of reaction parameters such as temperature and the amount of initiator on the preparation and properties of amphoteric resins made by polymerising solutions containing methacrylamide, triallylamine hydrochloride, and a chemical initiator.

Methacrylamide (5.1 g, 60 meq) was added to a 70 percent solution of triallylamine hydrochloride (8.3 ml, 35 meq) along with alpha, alpha'-azo-bis-isobutyronitrile and dimethylformamide (10 ml). The resultant solution was deoxygenated and heated to effect polymerisation. The washed and hydrolysed product was equilibrated to pH 7.3 and thermally regenerated as already described. The variation of the effective capacity with the amount of initiator and the reaction conditions is summarised below; the use of other organic solvents is also demonstrated.

| Amount of initiator w/w on total monomers | Polymerisation temperature °C | Reaction time hr | Effective capacity meq/g |
|---|---|---|---|
| 5 | 70 | 16 | 0.57 |
| 5 | 60 | 17 | .56 |
| 1 | 60 | 48 | .63 |
| 1[a] | 60 | 20 | .60 |
| 1[b] | 60 | 20 | .55 |
| 1[c] | 60 | 48 | .50 |

[a] Using double the standard amount of triallylamine hydrochloride
[b] With acetone as the solvent, instead of dimethylformamide
[c] With ethanol as the solvent, instead of dimethylformamide.

Example 15

This example shows the influence of the solvent on the properties of amphoteric resins made by the radiation polymerisation of methacrylamide and triallylamine hydrochloride.

The resins were prepared as outlined in Example 4, except that the solvent used to dissolve the two monomers was varied. The effect of this on the effective capacity of the products equilibrated to pH 7.3 is as shown:

| Solvent | Volume of solvent ml | Effective capacity meq/g |
|---|---|---|
| Water | 10 | 0.41 |
| Water | 12 | 0.44 |
| Water | 20 | 0.24 |
| Aqueous dimethylformamide 1 : 2 v/v | 12 | 0.52 |
| Aqueous dimethylformamide 1 : 1 v/v | 20 | 0.97 |
| Dimethylformamide | 10 | 0.84 |
| Dimethylformamide | 12 | 0.77 |
| Methanol | 12 | 0.98 |
| Ethanol | 12 | 1.07 |
| Propan-2-ol | 12 | 0.86 |
| Butan-1-ol | 12 | 0.74 |
| Acetone | 10 | 0.69 |
| Acetone | 12 | 0.61 |
| Methyl ethyl ketone | 12 | 0.62 |

It can be seen that organic solvents are preferred, although measurable capacities are still obtained when water is the solvent. All the products are opaque in appearance.

Example 16

This example illustrates the influence of the solvent on the ion-exchange behaviour of amphoteric resins prepared from methacrylamide and triallylamine hydrochloride, using a range of chemical initiators.

Methacrylamide (5.1 g, 60 meq) was added to a 70 percent solution of triallylamine hydrochloride (8.3 ml, 35 meq) together with the solvent (10 ml) and the chemical initiator (1 percent w/w on total monomers). The clear solution was deoxygenated and heated under nitrogen at 60°C for 20 hrs. The products were worked up and hydrolysed as before. The influence of the solvent/initiator combination on the effective capacity of the resins after thermal regeneration of samples equilibrated to pH 7.3 is shown below:

| Solvent | Initiator | Effective capacity meq/g | Physical appearance |
|---|---|---|---|
| Dimethyl formamide | alpha,alpha'-azo-bis-isobutyronitrile | 0.57 | opaque |
| Dimethylformamide" | do. | 0.63 | opaque |
| Acetone | do. | 0.55 | opaque |
| Ethanol | do. | 0.50 | opaque |
| Water | alpha,alpha'-azo-bis-beta-cyanoisovaleric acid | nil | clear |
| Water | alpha,alpha'-azo-bis isobutyroamidinium chloride | nil | clear |
| Water | potassium persulphate | nil | clear |
| Water | cumene hydroperoxide | nil | clear |

" With 5% w/w initiator, based on total monomers.

The results show quite clearly that under chemical initiation conditions the use of water as the solvent is very detrimental.

Example 17

The influence of total dose and dose rate on the properties of amphoteric resins made by the radiation polymerisation of methacrylamide and triallylamine hydrochloride is illustrated in this example.

Methacrylamide (51 g, 704 meq) was added to a 70 percent solution of triallylamine hydrochloride (83 ml, 352 meq), together with water (100 ml) and dimethylformamide (100 ml). The solution was divided into eight samples, which were deoxygenated and irradiated in the usual way, except that four different total doses were employed, each at two different dose rates. The effect of these variables on the effective capacities of the products, measured after thermal regeneration of samplee equilibrated to pH 7.3, is shown below:

| Total dose Mrad. | Dose rate Mrad/hr. | Effective capacity meq/g |
|---|---|---|
| 2 | 0.17 | 0.15 |
| 5 | 0.17 | 0.63 |
| 10 | 0.17 | 0.74 |
| 20 | 0.17 | 0.63 |
| 2 | 0.33 | 0.00 |
| 5 | 0.33 | 0.70 |
| 10 | 0.33 | 0.79 |
| 20 | 0.33 | 0.50 |

The preferred radiation conditions from these results can be seen to be 10 Mrad delivered at a dose rate of 0.33 Mrad/hr.

Example 18

This example shows that resins produced by the radiation polymerization of methacrylamide and triallylamine hydrochloride have different properties, depending on the hydrolysis conditions employed.

The preparative procedure described in Example 3 was repeated several times to give 13 samples of different unhydrolysed resins. Each sample was subjected to a different hydrolysis step, varied as shown below, the operation being carried out under nitrogen in each case. The effective capacity of the samples thermally regenerated after equilibration at pH 7.3 are indicated also.

| Sample No. | Hydrolysis reagent | Reaction time hr. | Reaction temperature | Effective capacity meq/g |
|---|---|---|---|---|
| 1 | 2 N.NaOH | 17 | 90 | 0.83 |
| 2 | 2 N.NaOH | 17 | 90 | 0.81 |
| 3 | 2 N.NaOH | 17 | 90 | 0.96 |
| 4 | 2 N.NaOH | 17 | 90 | 0.95 |
| 5 | 2 N.NaOH | 17 | 90 | 0.97 |
| 6 | 2 N.NaOH | 168 | 90 | 0.58 |
| 7 | 2 N.NaOH | 4 | 120 | 0.81 |
| 8 | 2 N.NaOH | 17 | 120 | 0.74 |
| 9 | 2N.NaOH plus 2N.HCl | 17 / 24 | 90 / 90 | 0.54 |
| 10 | 2 N.NaOH plus conc.$H_2SO_4$ | 17 / 72 | 90 / 30 | 0.46 |
| 11 | 2 N.HCl | 24 | 90 | nil |
| 12 | 2 N.HCl | 24 | 90 | 0.29 |
| 13 | 2 N.HCl plus 2N.NaOH | 24 / 17 | 90 / 90 | 0.90 |

The data show that prolonged alkaline hydrolysis is a disadvantage, and that acidic hydrolysis alone and even after alkaline hydrolysis is quite detrimental. However, good effective capacities are possible if acidic hydrolysis conditions are followed by alkaline hydrolysis, but there is no practical advantage to this combination of reagents. Alkaline hydrolysis using 2 N.NaOH at 90° for 17 hrs has been selected as a useful means of converting the amide groups in the resin to carboxylate groups.

Example 19

In this example the preparation and properties of amphoteric resin beads made by the chemically initiated polymerization of methacrylamide and 1,6-bis-(N,N-diallylamino) hexane dihydrochloride is illustrated.

Methacrylamide (6.2 g, 69 meq) was mixed with 1,6-bis(N,N-diallylamino) hexane (5.3 g, 39 meq) and 5 N hydrochloric acid at ice bath temperature. Dimethylformamide (15 ml) was also added, together with alpha, alpha'-azo-bis-isobutyronitrile (0.33 g or 2.5 percent w/w on total monomers). The quantity of acid added was such as to give a final solution pH of 4.8.

A suspension polymerisation was then carried out by the method of Example 5, except that a reaction temperature of 70°C was maintained for a total period of 65 hr. After the usual work up and hydrolysis, a product was obtained which had an effective capacity of 0.29 meq/g, measured on a sample thermally regenerated after equilibration to pH 7.3.

Example 20

In this example the preparation and properties of amphoteric resin beads made by the chemically initiated polymerisation of acrylamide and 1,6-bis(N,N-diallylamino) hexane dihydrochloride is described.

Acrylamide (3.6 g, 51 meq) and 1,6-bis(N,N-diallylamino) hexane dihydrochloride (8.9 g, 51 meq) were dissolved in propan-2-ol (8.0 ml), together with alpha, alpha'-azo-bis-isobutyronitrile (0.31 g or 2.5 percent w/w on total monomers).

A suspension polymerisation by the method of Example 5 was then effected, using a reaction temperature of 80°C for 17 hr. The product, after washing and hydrolysis, followed by equilibration to pH 6.8 and thermal regeneration, had an effective capacity of 0.28 meq/g.

Example 21

This example demonstrates the preparation of amphoteric resin beads by the chemically initiated polymerisation of a solution containing acrylamide, triallylamine hydrochloride and vinyl acetate.

Acrylamide (5 g. 70 meq), triallylamine hydrochloride (11.6 g, 70 meq) and vinyl acetate (5.8 g or 26 percent w/w on all monomers) were added to propan-2-ol (12.0 ml), together with alpha, alpha'-azo-bis-isobutyronitrile (0.52 g or 2.5 percent w/w on total monomers).

A suspension polymerisation by the method of Example 5 was carried out at 70°C for 21 hr. The product was worked up and hydrolysed with alkali in the usual manner. A very hard and opaque resin resulted. The effective capacity of a thermally regenerated sample which had been equilibrated to pH 6.8 in 1000 ppm saline was found to be 0.70 meq/g.

Example 22

In this example the preparation of amphoteric resin beads by the chemically initiated polymerisation of a solution containing acrylamide, triallylamine hydrochloride, and divinylbenzene is described.

Acrylamide (5 g, 70 meq), triallylamine hydrochloride (11.6 g, 70 meq) and divinylbenzene (4.0 ml of a solution containing divinylbenzene, 54 percent w/w, ethylvinylbenzene, and diethylbenzene) were dissolved in propan-2ol (9.0 ml), together with alpha, alpha'-azo-bis-isobutyronitrile (0.46 g or 2.5 percent w/w on the three major monomers).

The solution was dispersed and polymerized at 80°C for 17 hr by the method of Example 5. The product after washing and alkaline hydrolysis was in the form of hard beads.

Example 23

This example describes the preparation of an amphoteric resin from methacrylamide, triallylamine hydrochloride, and methyldiallylamine hydrochloride, the latter being polymerized separately in solution and reacted with the other two monomers in a suspension polymerisation carried out as a second step. Conventional chemical initiation was used throughout.

A 70 percent solution of methyldiallylamine hydrochloride (11.2 ml, 53 meq) was mixed with dimethylformamide (10.0 ml) containing alpha, alpha'-azo-bis-isobutyronitrile (0.20 g or 2.5 percent w/w on monomer). After deoxygenation, the solution was heated at 70°C for 17 hrs.

The cooled polymer solution was added to methacrylamide (10.2 g, 120 meq) and 70 percent triallylamine hydrochloride solution (4.2 ml, 18 meq) in dimethylformamide (10.0 ml) containing more alpha, alpha'-azo-bis-isobutyronitrile (0.33 g). The final solution was polymerised as a suspension at 70°C for 17 hrs by the method of Example 5. The washed and hydrolysed product was in the form of opaque beads.

We claim:

1. A process of manufacturing an amphoteric polymeric composition which comprises the steps of:
   a. polymerising in the presence of a free radical initiator a mixture of monomers comprising
      i. an acidic monomer selected from the group consisting of acrylamide, methacrylamide, and lower alkyl esters of acrylic and methacrylic acid, and mixtures thereof, where the lower alkyl group of the alcohol portion of the ester contains from 1 to 6 carbon atoms; and
      ii. a basic monomer selected from the group consisting of a strong mineral acid salt of triallylamine, 1,4-bis(N,N-diallylaminomethyl)benzene, 2,4,6-tris(N,N-diallylaminomethyl)toluene, 1,6-bis(N,N-diallylamino) hexane, methyldiallylamine, and ethyldiallylamine, and mixtures thereof; wherein the mixture of monomers is dissolved in a polar, non-aqueous solvent system, and
   b. subsequently hydrolyzing the polymeric composition obtained in (a) to form an amphoteric polymeric composition having thermally regenerable ion-exchange capacity.

2. The process of claim 1 wherein the solution of the monomers in the polar solvent in (a) is dispersed in a second liquid phase.

3. The process of claim 2 wherein the second liquid phase is an immiscible non-polar organic solvent.

4. A process according to claim 1 wherein the non-aqueous solvent system comprises acetone, acetonitrile, dimethylsulphoxide, dimethylformamide, methyl ethyl ketone or lower alkyl alcohol of from one to six carbon atoms.

5. A process according to claim 3 wherein the polar organic solvent is chosen from the group consisting of acetone, acetonitrile, dimethylsulphoxide, dimethylformamide, ethylmethylketone and lower alkyl alcohol containing from one to six carbon atoms, and the non-polar solvent is chosen from the group consisting of petroleum ether, paraffin oil, aromatic hydrocarbons and chlorinated hydrocarbons.

6. A process according to claim 1 wherein the monomer mixture contains a third monomer component which is non-charged.

7. A process according to claim 6 wherein the third monomer is a cross-linking agent.

8. A process according to claim 7 wherein the cross-linking agent is chosen from the group consisting of ethylene glycol dimethyacrylate, 1,3-butylene glycol dimethacrylate, divinylbenzene, triallyl cyanurate and the triallyl ether of pentaerythritol.

9. A process according to claim 7 wherein the cross-linking agent is present in an amount from 10 to 30 percent w/w of the polymeric composition.

10. A process according to claim 7 wherein the third monomer is chosen from the group consisting of vinyl acetate, methyl vinyl ether and styrene.

11. A process according to claim 10 wherein the proportion of the third monomer lies in the range from 5 – 50 percent w/w of the polymeric composition.

12. A process according to claim 1 wherein the molar ratio of basic monomer to acidic monomer is in the range from 20 : 80 to 60 : 40.

* * * * *